US010106277B2

(12) United States Patent
 Neely (10) Patent No.: US 10,106,277 B2
(45) Date of Patent: Oct. 23, 2018

(54) SELF-STABILIZING SPHERICAL UNMANNED AERIAL VEHICLE CAMERA ASSEMBLY

(71) Applicant: Carl Michael Neely, Vancouver (CA)

(72) Inventor: Carl Michael Neely, Vancouver (CA)

(*) Notice: Subject to any disclaimer, the term of this patent is extended or adjusted under 35 U.S.C. 154(b) by 227 days.

(21) Appl. No.: 15/289,282

(22) Filed: Oct. 10, 2016

(65) Prior Publication Data
US 2018/0002035 A1   Jan. 4, 2018

Related U.S. Application Data

(60) Provisional application No. 62/239,539, filed on Oct. 9, 2015.

(51) Int. Cl.
| | |
|---|---|
| *B64D 47/08* | (2006.01) |
| *B23P 19/04* | (2006.01) |
| *H04N 5/00* | (2011.01) |
| *H04N 13/243* | (2018.01) |
| *H04N 13/296* | (2018.01) |
| *H04N 5/232* | (2006.01) |
| *B64C 27/00* | (2006.01) |

(Continued)

(52) U.S. Cl.
CPC .............. *B64D 47/08* (2013.01); *B23P 19/04* (2013.01); *B64C 27/006* (2013.01); *B64C 39/024* (2013.01); *H04N 5/00* (2013.01); *H04N 13/204* (2018.05); *H04N 13/243* (2018.05); *H04N 13/296* (2018.05); *B64C 2201/024* (2013.01); *B64C 2201/027* (2013.01); *B64C 2201/127* (2013.01); *H04N 5/2328* (2013.01); *H04N 2213/001* (2013.01)

(58) Field of Classification Search
CPC ..... B23P 19/04; B64D 47/08; H04N 13/0203; H04N 5/00; H04N 13/204; H04N 13/243; H04N 13/296; H04N 2213/001; H04N 5/2328; B64C 2201/024; B64C 2201/027; B64C 2201/127; B64C 27/006; B64C 39/024
See application file for complete search history.

(56) References Cited

U.S. PATENT DOCUMENTS

| | | | |
|---|---|---|---|
| 8,874,283 B1* | 10/2014 | Cavote ................... | B64D 47/08 701/11 |
| 2012/0316701 A1* | 12/2012 | Thielman ............... | B62D 57/00 701/2 |

(Continued)

*Primary Examiner* — Anner N Holder
(74) *Attorney, Agent, or Firm* — Clements Bernard Walker PLLC; Lawrence A. Baratta, Jr.

(57) ABSTRACT

A self-stabilizing spherical unmanned aerial vehicle (UAV) camera assembly, including: a stabilizer assembly; a plurality of motors coupled to the stabilizer assembly; a spherical camera mounting cage assembly disposed about and coupled to the stabilizer assembly; and a plurality of cameras coupled to the spherical camera mounting cage assembly. Preferably, the plurality of cameras include a plurality of stereoscopic cameras coupled to an exterior of the spherical camera mounting cage assembly. The self-stabilizing spherical UAV camera assembly is capable of taking/recording 360 degree×180 degree stereoscopic photo/video content. The self-stabilizing spherical UAV camera assembly can also be used with various real-time visualization and control technologies.

20 Claims, 9 Drawing Sheets

(51) Int. Cl.
*B64C 39/02* (2006.01)
*H04N 13/204* (2018.01)

(56) References Cited

U.S. PATENT DOCUMENTS

| | | | |
|---|---|---|---|
| 2013/0222115 A1* | 8/2013 | Davoodi | H04Q 9/00 |
| | | | 340/10.1 |
| 2016/0144954 A1* | 5/2016 | Daigle | B64C 39/024 |
| | | | 244/17.23 |
| 2016/0173740 A1* | 6/2016 | Corby | G06K 9/6267 |
| | | | 348/144 |
| 2016/0280359 A1* | 9/2016 | Semke | B64C 25/32 |
| 2016/0301845 A1* | 10/2016 | Bell | H04N 5/2328 |
| 2016/0304217 A1* | 10/2016 | Fisher | B60L 11/1809 |

* cited by examiner

Front View
(Displays the stabilizer fill radius)

FIG. 6

Top View

Top View

Side View

SELF-STABILIZING SPHERICAL UNMANNED AERIAL VEHICLE CAMERA ASSEMBLY

CROSS-REFERENCE TO RELATED APPLICATION(S)

The present patent/patent application claims priority to U.S. Provisional Application No. 62/239,539, filed Oct. 9, 2015, and entitled "SELF-STABILIZING SPHERICAL UNMANNED AERIEL VEHICLE CAMERA ASSEMBLY," the contents of which are incorporated by reference.

FIELD OF THE DISCLOSURE

The present invention relates generally to the photography/videography and unmanned aerial vehicle (UAV) fields. More specifically, the present invention relates to a self-stabilizing spherical UAV camera assembly that is capable of taking/recording 360 degree×180 degree stereoscopic photo/video content. The self-stabilizing spherical UAV camera assembly can also be used with various real-time visualization and control technologies.

BACKGROUND OF THE DISCLOSURE

Various self-stabilizing UAV camera assemblies (also referred to herein as drone camera assemblies) exist. Typically, these UAV camera assemblies include a conventional drone with a gimbal rig and stereoscopic camera attached thereto. The stereoscopic camera is well known to those of ordinary skill in the art and includes two or more lenses with a separate film frame or image sensor for each lens. This allows the stereoscopic camera to simulate human binocular vision, and therefore gives it the ability to capture three-dimensional (3D) photo/video images. Stereoscopic cameras can therefore be used for making stereoscopic views and 3D pictures for movies, or for range imaging, for example. Panoramic images are typically achieved by combining, or "stitching" the images or movies from each of the lenses around the camera assembly to create a single image or movie for each of the stereoscopic views.

Disadvantageously, however, the cameras often capture an image of a portion of the obstructing support rig, and in some cases the operator. This portion of the image must be removed via post-processing and can cause problems for real-time visualization. Thus, what is still needed in the art is a self-stabilizing UAV camera assembly that is capable of taking/recording 360 degree×180 degree stereoscopic photo/video content without the use of an obstructing support rig. Preferably, a single signal is transmitted to the ground receiver. The present invention provides such a self-stabilizing spherical UAV camera assembly

BRIEF SUMMARY OF THE DISCLOSURE

In various exemplary embodiments, the present invention provides a self-stabilizing spherical UAV camera assembly that is capable of taking/recording 360 degree×180 degree stereoscopic photo/video content without the use of an obstructing support rig. Preferably, a single signal is transmitted to the ground receiver. The self-stabilizing spherical UAV camera assembly is configured to capture panoramic views without obstructions from mechanical components associated with the self-stabilizing spherical UAV camera assembly.

In one exemplary embodiment, the present invention provides a self-stabilizing spherical unmanned aerial vehicle (UAV) camera assembly, including: a stabilizer assembly; a plurality of motors coupled to the stabilizer assembly; a spherical camera mounting cage assembly disposed about and coupled to the stabilizer assembly; and a plurality of cameras coupled to the spherical camera mounting cage assembly. The plurality of motors includes one of a plurality of propellers and a plurality of ducted fans operable for lifting and controlling the UAV camera assembly. The stabilizer assembly is operable for tilting the spherical camera mounting cage assembly about two axes with respect to the stabilizer assembly. Optionally, the stabilizer assembly is operable for rotating the spherical camera mounting cage assembly about a central axis with respect to the stabilizer assembly. Preferably, the plurality of cameras includes a plurality of stereoscopic cameras. Preferably, the plurality of cameras is coupled to an exterior of the spherical camera mounting cage assembly. The self-stabilizing spherical UAV camera assembly also includes an on-board processor for processing signals from the plurality of cameras.

In another exemplary embodiment, the present invention provides a method for providing a self-stabilizing spherical unmanned aerial vehicle (UAV) camera assembly, including: providing a stabilizer assembly; providing a plurality of motors coupled to the stabilizer assembly; providing a spherical camera mounting cage assembly disposed about and coupled to the stabilizer assembly; and providing a plurality of cameras coupled to the spherical camera mounting cage assembly. The plurality of motors includes one of a plurality of propellers and a plurality of ducted fans operable for lifting and controlling the UAV camera assembly. The stabilizer assembly is operable for tilting the spherical camera mounting cage assembly about two axes with respect to the stabilizer assembly. Optionally, the stabilizer assembly is operable for rotating the spherical camera mounting cage assembly about a central axis with respect to the stabilizer assembly. Preferably, the plurality of cameras includes a plurality of stereoscopic cameras. Preferably, the plurality of cameras is coupled to an exterior of the spherical camera mounting cage assembly. The method for providing the self-stabilizing spherical UAV camera assembly also includes an on-board processor for processing signals from the plurality of cameras

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present invention provides such a self-stabilizing spherical UAV camera assembly that is capable of taking/recording 360 degree×180 degree stereoscopic photo/video content without the use of an obstructing support rig. Preferably, a single signal is transmitted to the ground receiver.

Figure 1:
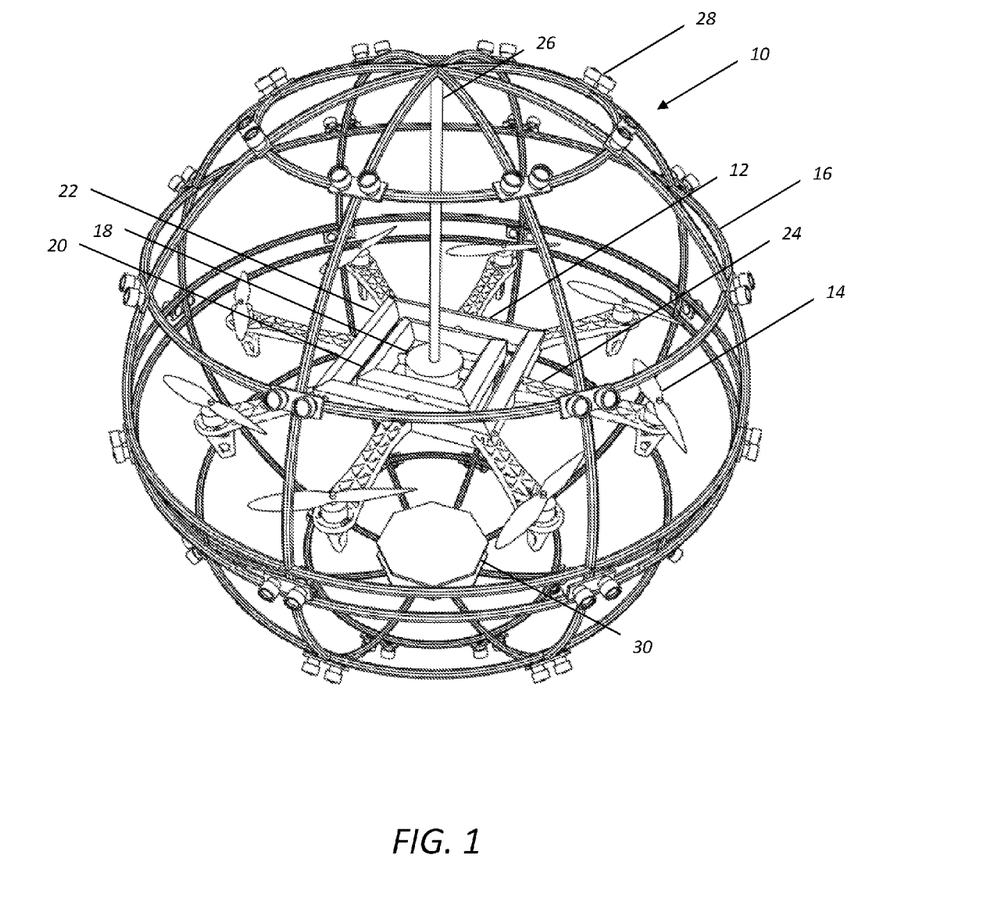
FIG. 1 is a perspective view of one exemplary embodiment of the self-stabilizing spherical UAV camera assembly of the present invention.
Figure 2:
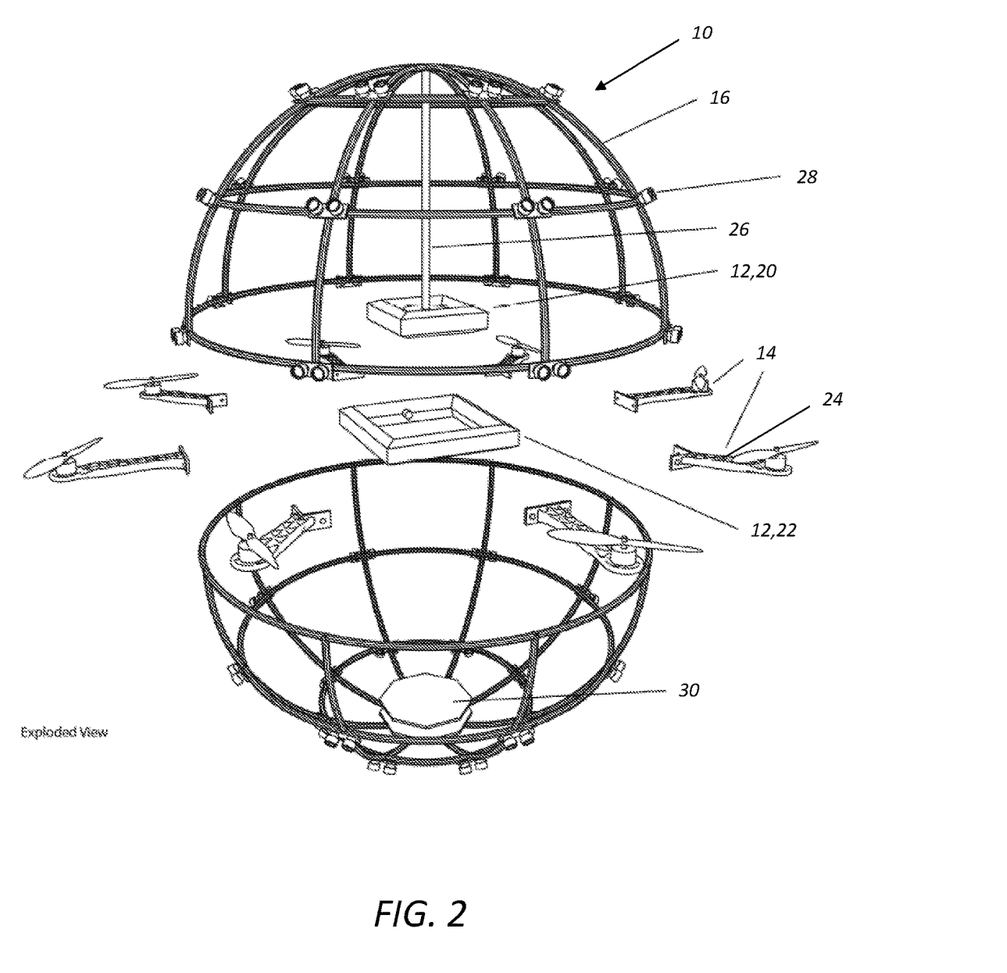
FIG. 2 is an exploded perspective view of the one exemplary embodiment of the self-stabilizing spherical UAV camera assembly of the present invention.

Referring now specifically to FIGS. 1 and 2, in one exemplary embodiment, the self-stabilizing spherical UAV camera assembly 10 includes a stabilizer assembly 12 and a plurality of motors 14 coupled to the stabilizer assembly 12. The stabilizer assembly 12 is operable for tilting the UAV camera assembly 10 about two axes. Optionally, the stabilizer assembly 12 is also operable for rotating an attached spherical camera mounting cage assembly 16 about a central axis with respect to the stabilizer assembly 12. In this exemplary embodiment, the stabilizer assembly 12 includes a central member 18 coupled to an inner frame member 20 coupled to an outer square frame member 22. The central member 18 is configured to be tilted about a first axis with respect to the inner frame member 20, and the inner frame member 20 is configured to be tilted about a second axis perpendicular to the first axis with respect to the outer frame member 22. The plurality of motors 14 are coupled to the stabilizer assembly 12 via a plurality of arms 24 attached to the outer frame member 22. In this manner, the roll, pitch, and yaw of the stabilizer assembly 12 can be controlled. The stabilizer assembly 12 is coupled to the spherical camera mounting cage assembly 16 via a central pole structure 26 coupled to the central member 18. In this manner, the roll, pitch, and yaw of the spherical camera mounting cage assembly 16 can also be controlled.

In general, the stabilizer assembly 12 and plurality of motors 14 represent a conventional drone that can move and/or rotate in any direction in space, via manual or automated (i.e. sensor-based) control, both well known to those of ordinary skill in the art. Thus, the attached spherical camera mounting cage assembly 16 can be moved, oriented, and stabilized in space with a photo/video is obtained. Any rotor configuration, gyroscopic arrangement, and/or control/feedback system can be used to accomplish these purposes, whether conventional or novel. For example, one or more of the plurality of motors 14 can be made to pivot with respect to the stabilizer assembly 12 or its outer frame member 22. An eight-rotor configuration is illustrated by way of example only.

The spherical camera mounting cage assembly 16 disposed about the stabilizer assembly 12 consists of a frame structure that is designed to maximize rigidity, while minimizing weight. Preferably, this frame structure is manufactured from a lightweight metallic, composite, or plastic material. Preferably, wires are disposed in/adjacent to the various members of the frame structure, or circuit traces are printed or formed along the various members of the frame structure, by which the various electronic components, circuit boards, power supplies, and the like are connected. Preferably, the plurality of cameras 28 coupled to the spherical camera mounting cage assembly 16 include a plurality of stereoscopic cameras. Preferably, the plurality of cameras 28 are coupled to the exterior of the spherical camera mounting cage assembly 16. The stereoscopic cameras are well known to those of ordinary skill in the art and include two or more lenses (or cameras) with a separate film frame or image sensor for each lens (or camera). This allows the stereoscopic cameras to simulate human binocular vision, and therefore gives them the ability to capture 3D photo/video images. Stereoscopic cameras can therefore be used for making stereoscopic views and 3D images for movies, or for range imaging, for example. Accordingly, the self-stabilizing spherical UAV camera assembly 10 is capable of taking/recording 360 degree×180 degree stereoscopic photo/video content without the use of an obstructing gimbal rig.

The self-stabilizing spherical UAV camera assembly 10 also includes an on-board processor 30 for processing signals from the plurality of cameras 28. Preferably, a single signal is transmitted to the ground receiver as a result. The on-board processor 30 can be the processing device 100 illustrated in FIG. 9 which communicates to a mobile device 200 illustrated in FIG. 10.

Figure 3:
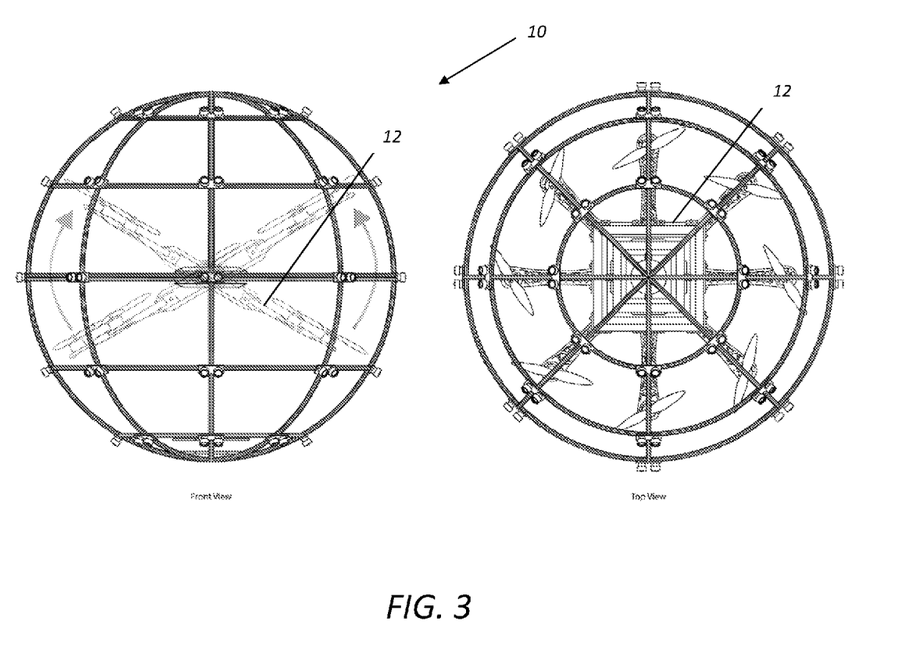
FIG. 3 is a pair of planar views of the one exemplary embodiment of the self-stabilizing spherical UAV camera assembly of the present invention, highlighting the tilt radius of the stabilizer assembly.

FIG. 3 is a pair of planar views of the one exemplary embodiment of the self-stabilizing spherical UAV camera assembly 10 of the present invention, highlighting the tilt radius of the stabilizer assembly 12. In an exemplary embodiment, the stabilizer assembly 12 can tilt between 45 degrees and −45 degrees. Other tilt angles are also contemplated.

Referring now specifically to FIGS. 4-8, in a second exemplary embodiment, a self-stabilizing spherical UAV camera assembly 50 includes a stabilizer assembly 52 and a plurality of motors 54 coupled to the stabilizer assembly 52. The stabilizer assembly 52 is operable for tilting the UAV camera assembly 50 about two axes. Optionally, the stabilizer assembly 52 is also operable for rotating an attached spherical camera mounting cage assembly 56 about a central axis with respect to the stabilizer assembly 52. In this exemplary embodiment, the stabilizer assembly 52 includes a central member 58 coupled to an inner frame member 60 coupled to an outer square frame member 62. The central member 58 is configured to be tilted about a first axis with respect to the inner frame member 60, and the inner frame member 60 is configured to be tilted about a second axis perpendicular to the first axis with respect to the outer frame member 62. The plurality of motors 54 are coupled to the stabilizer assembly 52 via a plurality of arms 64 attached to the outer frame member 62. In this manner, the roll, pitch, and yaw of the stabilizer assembly 52 can be controlled. The stabilizer assembly 52 is coupled to the spherical camera mounting cage assembly 56 via a central pole structure 66 coupled to the central member 58. In this manner, the roll, pitch, and yaw of the spherical camera mounting cage assembly 56 can also be controlled.

Figure 4:
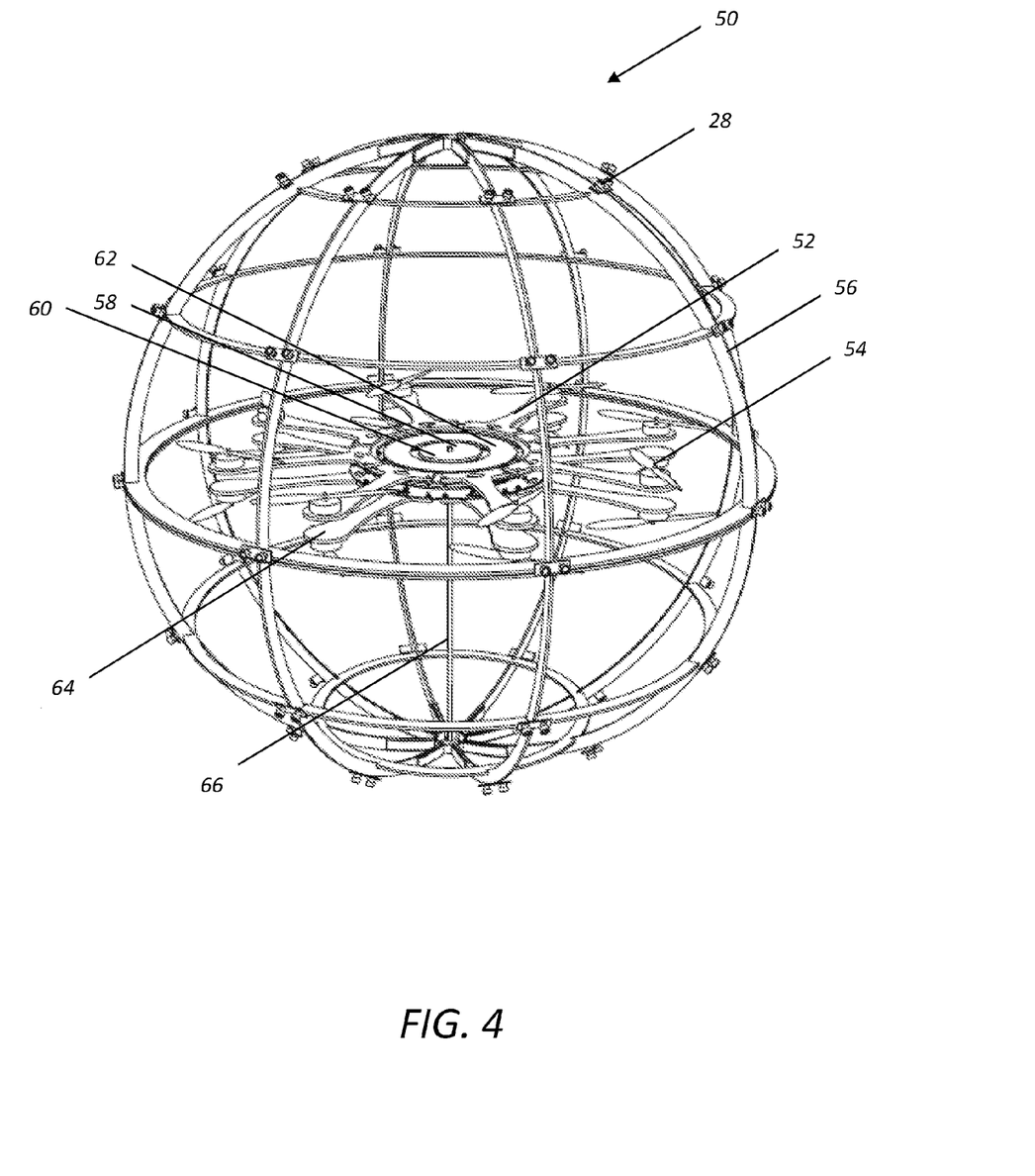
FIG. 4 is a perspective view of a second exemplary embodiment of the self-stabilizing spherical UAV camera assembly of the present invention.
Figure 5:
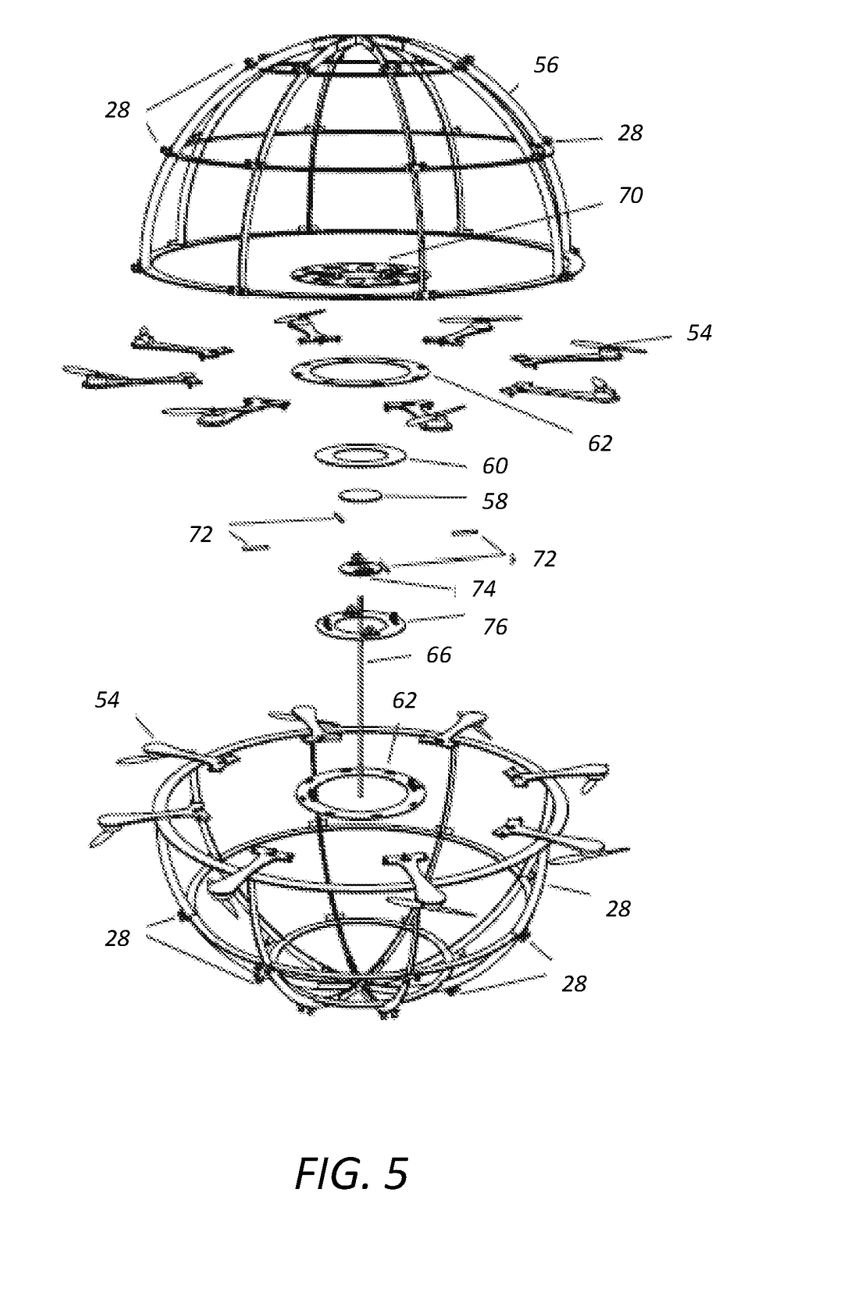
FIG. 5 is an exploded perspective view of the second exemplary embodiment of the self-stabilizing spherical UAV camera assembly of the present invention.

In general, the stabilizer assembly 52 and plurality of motors 54 represent a conventional drone that can move and/or rotate in any direction in space, via manual or automated (i.e. sensor-based) control, both well known to those of ordinary skill in the art. Thus, the attached spherical camera mounting cage assembly 16 can be moved, oriented, and stabilized in space with a photo/video is obtained. Any rotor configuration, gyroscopic arrangement, and/or control/feedback system can be used to accomplish these purposes, whether conventional or novel. For example, one or more of the plurality of motors 54 can be made to pivot with respect to the stabilizer assembly 52 or its outer frame member 62. A sixteen-rotor configuration is illustrated by way of example only.

The spherical camera mounting cage assembly 56 disposed about the stabilizer assembly 52 consists of a frame structure that is designed to maximize rigidity, while minimizing weight. Preferably, this frame structure is manufactured from a lightweight metallic, composite, or plastic material. Preferably, wires are disposed in/adjacent to the various members of the frame structure, or circuit traces are printed or formed along the various members of the frame structure, by which the various electronic components, circuit boards, power supplies, and the like are connected. Preferably, the plurality of cameras 28 coupled to the spherical camera mounting cage assembly 16 include a plurality of stereoscopic cameras. Preferably, the plurality of cameras 28 are coupled to the exterior of the spherical camera mounting cage assembly 56. The stereoscopic cameras are well known to those of ordinary skill in the art and include two or more lenses (or cameras) with a separate film frame or image sensor for each lens (or camera). This allows the stereoscopic cameras to simulate human binocular vision, and therefore gives them the ability to capture 3D photo/video images. Stereoscopic cameras can therefore be used for making stereoscopic views and 3D images for movies, or for range imaging, for example. Accordingly, the self-stabilizing spherical UAV camera assembly 50 is capable of taking/recording 360 degree×180 degree stereoscopic photo/video content without the use of an obstructing gimbal rig.

The self-stabilizing spherical UAV camera assembly 50 also includes an on-board processor 70 located in the central member 58 for processing signals from the plurality of cameras 28. Preferably, a single signal is transmitted to the ground receiver as a result. The on-board processor 70 can be the processing device 100 illustrated in FIG. 9 which communicates to a mobile device 200 illustrated in FIG. 10.

Figure 6:
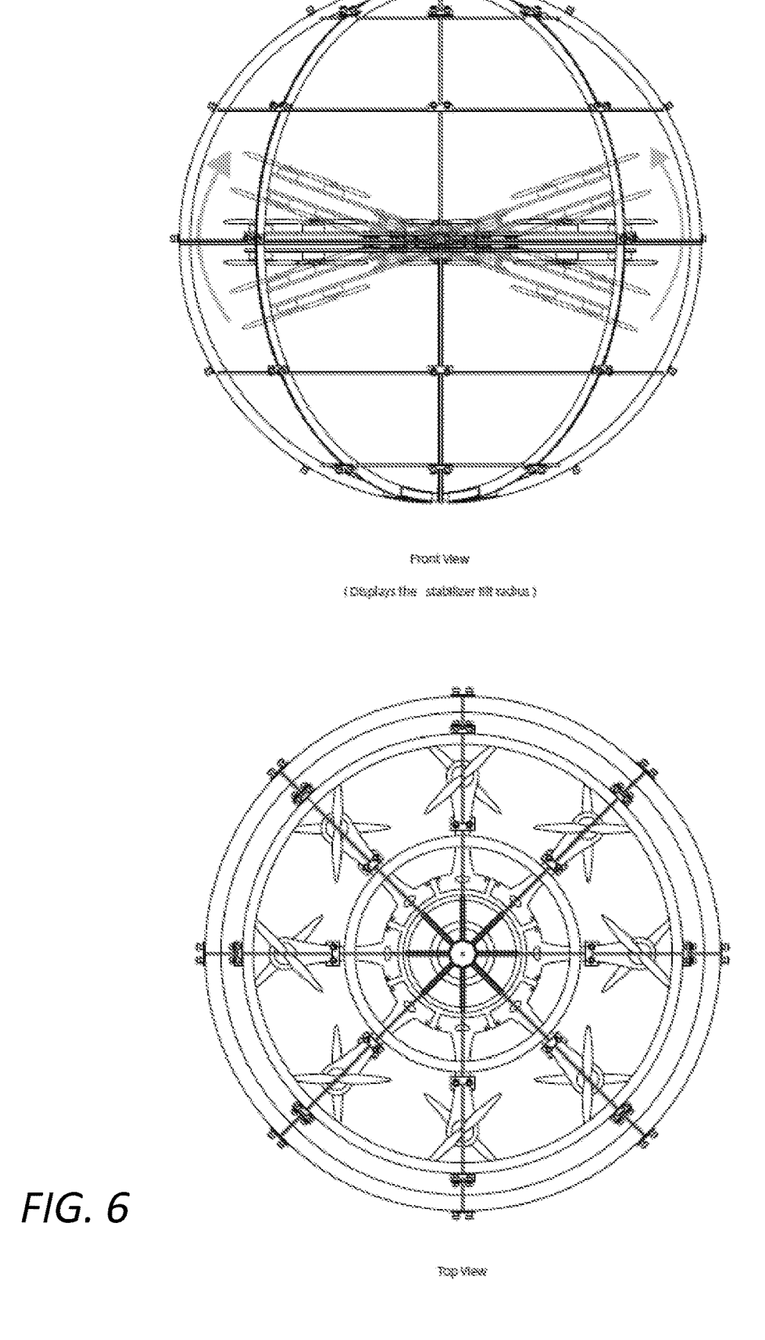
FIG. 6 is a pair of planar views of the second exemplary embodiment of the self-stabilizing spherical UAV camera assembly of the present invention, highlighting the tilt radius of the stabilizer assembly.

FIG. 6 is a pair of planar views of the one exemplary embodiment of the self-stabilizing spherical UAV camera assembly 50 of the present invention, highlighting the tilt radius of the stabilizer assembly 52. In an exemplary embodiment, the stabilizer assembly 12 can tilt between 45 degrees and −45 degrees. Other tilt angles are also contemplated.

Figure 7:
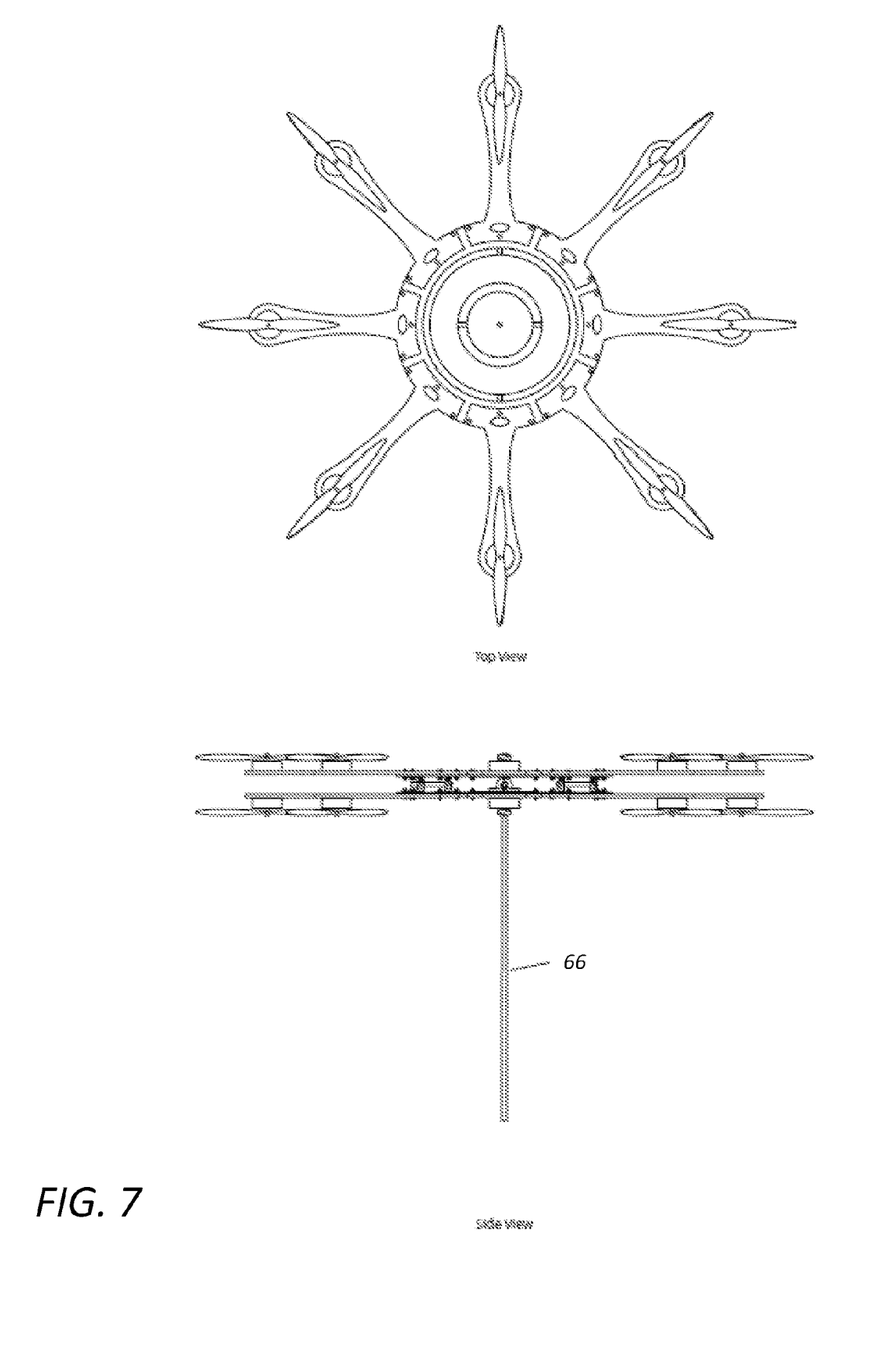
FIG. 7 is a perspective view of the stabilizer assembly of the second exemplary embodiment of the present invention.
Figure 8:
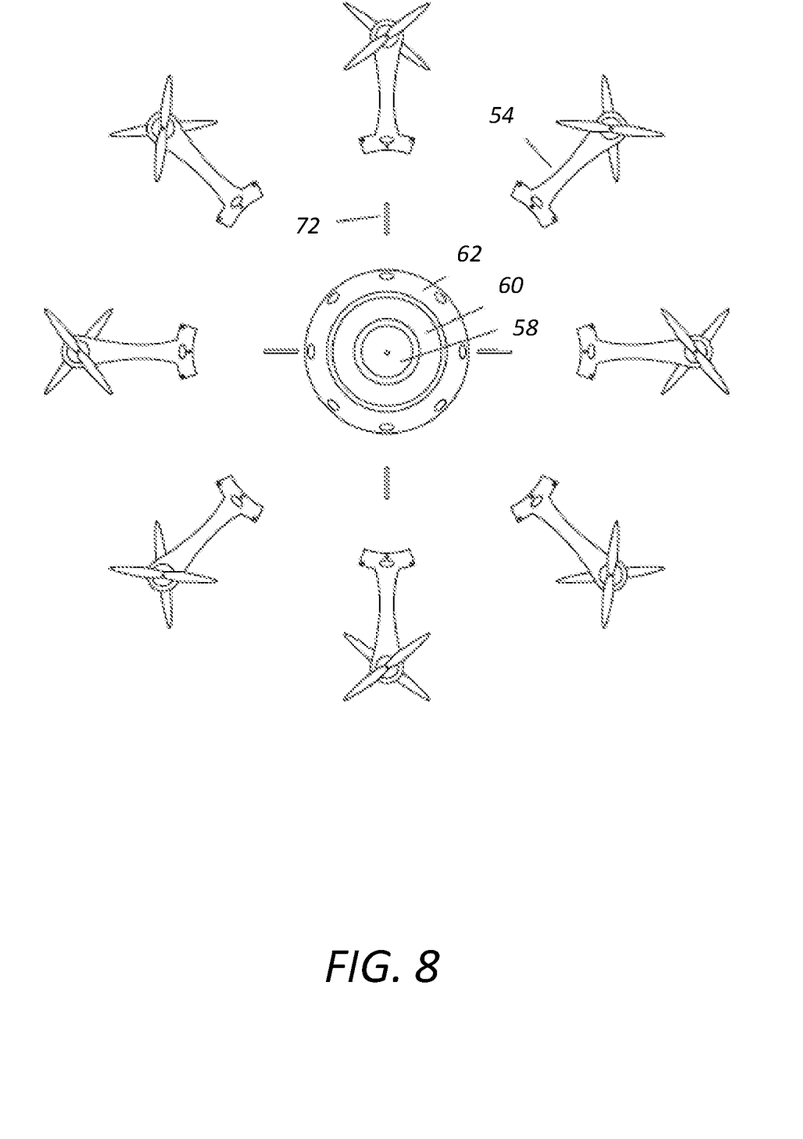
FIG. 8 is an exploded perspective view of the stabilizer assembly of the second exemplary embodiment of the present invention.

FIG. 7 is a perspective view of the stabilizer assembly of the second exemplary embodiment of the present invention; and FIG. 8 is an exploded perspective view of the stabilizer assembly of the second exemplary embodiment of the present invention.

Again, in this exemplary embodiment, the stabilizer assembly 52 includes the central member 58 coupled to the inner frame member 60 coupled to the outer square frame member 62. The central member 58 is configured to be tilted about a first axis with respect to the inner frame member 60, and the inner frame member 60 is configured to be tilted about a second axis perpendicular to the first axis with respect to the outer frame member 62. A plurality of stabilizer shafts 72 are included with an outer stabilizer ring 74 with stabilizer bearings and a middle stabilizer ring 76 with stabilizer bearings.

Figure 9:
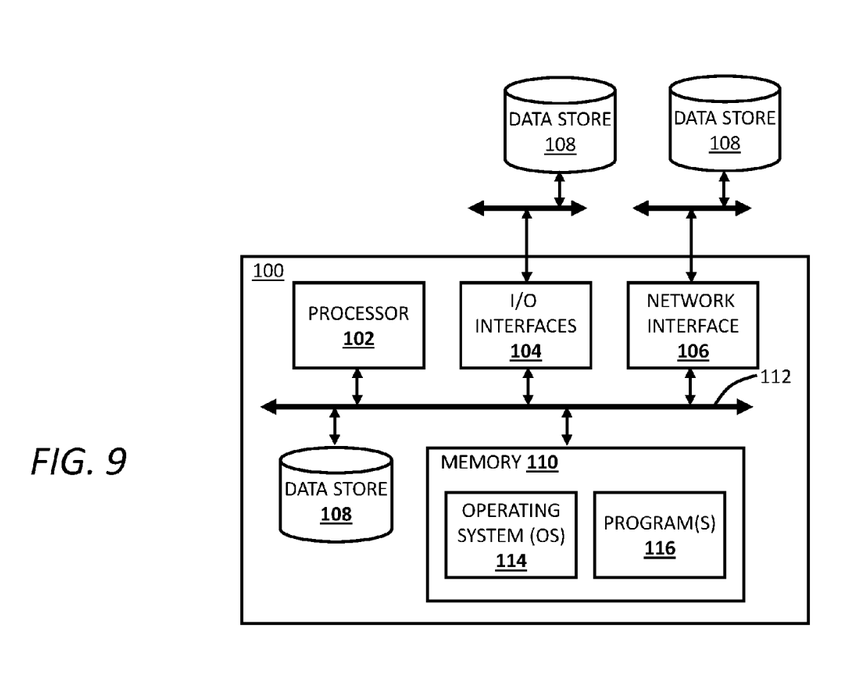
FIG. 9 is a block diagram of a processing device which may be incorporated or associated with the stabilizing spherical UAV camera assembly.

Referring to FIG. 9, in an exemplary embodiment, a block diagram illustrates a processing device 100 which may be incorporate or associated with the stabilizing spherical UAV camera assembly 10. The processing device 100 may be a digital computer that, in terms of hardware architecture, generally includes a processor 102, input/output (I/O) interfaces 104, a network interface 106, a data store 108, and memory 110. It should be appreciated by those of ordinary skill in the art that FIG. 9 depicts the processing device 100 in an oversimplified manner, and a practical embodiment may include additional components and suitably configured processing logic to support known or conventional operating features that are not described in detail herein. The components (102, 104, 106, 108, and 110) are communicatively coupled via a local interface 112. The local interface 112 may be, for example but not limited to, one or more buses or other wired or wireless connections, as is known in the art. The local interface 112 may have additional elements, which are omitted for simplicity, such as controllers, buffers (caches), drivers, repeaters, and receivers, among many others, to enable communications. Further, the local interface 112 may include address, control, and/or data connections to enable appropriate communications among the aforementioned components.

The processor 102 is a hardware device for executing software instructions. The processor 102 may be any custom made or commercially available processor, a central processing unit (CPU), an auxiliary processor among several processors associated with the processing device 100, a semiconductor-based microprocessor (in the form of a microchip or chip set), or generally any device for executing software instructions. When the processing device 100 is in operation, the processor 102 is configured to execute software stored within the memory 110, to communicate data to and from the memory 110, and to generally control operations of the processing device 100 pursuant to the software instructions. The I/O interfaces 104 may be used to receive user input from and/or for providing system output to one or more devices or components. User input may be provided via, for example, a keyboard, touch pad, and/or a mouse. System output may be provided via a display device and a printer (not shown). I/O interfaces 104 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 106 may be used to enable the processing device 100 to communicate over a network, such as the Internet, the WAN 101, the enterprise 200, and the like, etc. The network interface 106 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 106 may include address, control, and/or data connections to enable appropriate communications on the network. A data store 108 may be used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media. In one example, the data store 1208 may be located internal to the processing device 100 such as, for example, an internal hard drive connected to the local interface 112 in the processing device 100. Additionally, in another embodiment, the data store 108 may be located external to the processing device 100 such as, for example, an external hard drive connected to the I/O interfaces 104 (e.g., SCSI or USB connection). In a further embodiment, the data store 108 may be connected to the processing device 100 through a network, such as, for example, a network attached file server.

The memory 110 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 110 may incorporate electronic, magnetic, optical, and/or other types of storage media. Note that the memory 110 may have a distributed architecture, where various components are situated remotely from one another, but can be accessed by the processor 102. The software in memory 110 may include one or more software programs, each of which includes an ordered listing of executable instructions for implementing logical functions. The software in the memory 110 includes a suitable operating system (O/S) 114 and one or more programs 116. The operating system 114 essentially controls the execution of other computer programs, such as the one or more programs 116, and provides scheduling, input-output control, file and data management, memory management, and communication control and related services. The one or more programs 116 may be configured to implement the various processes, algorithms, methods, techniques, etc. described herein.

Figure 10:
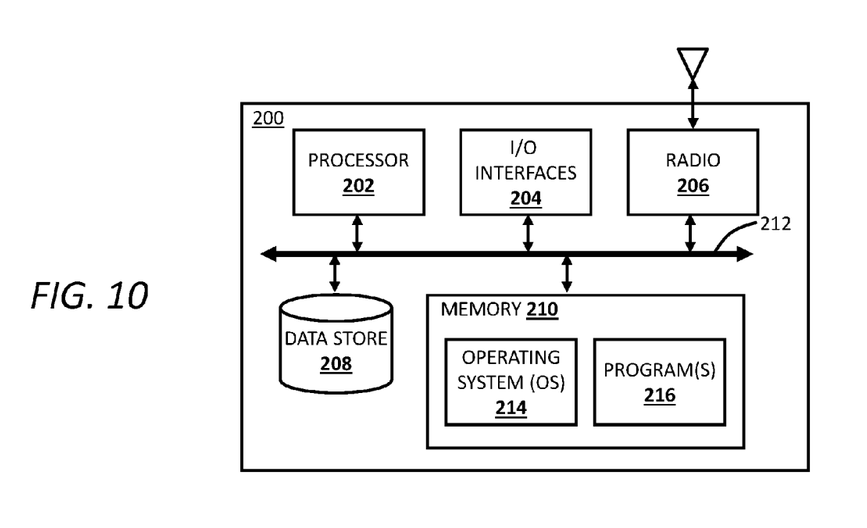
FIG. 10 is a block diagram of a mobile device, which may be used to control the stabilizing spherical UAV camera assembly, such as via communication with the processing device of FIG. 9.

Referring to FIG. 10, in an exemplary embodiment, a block diagram illustrates a mobile device 200, which may be used to control the stabilizing spherical UAV camera assembly 10, such as via communication with the processing device 100. The mobile device 200 can be a digital device that, in terms of hardware architecture, generally includes a processor 202, input/output (I/O) interfaces 204, a radio 206, a data store 208, and memory 210. It should be appreciated by those of ordinary skill in the art that FIG. 10 depicts the mobile device 200 in an oversimplified manner, and a practical embodiment may include additional components and suitably configured processing logic to support known or conventional operating features that are not described in detail herein. The components (202, 204, 206, 208, and 202) are communicatively coupled via a local interface 212. The local interface 212 can be, for example but not limited to, one or more buses or other wired or wireless connections, as is known in the art. The local interface 212 can have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 can be any custom made or commercially available processor, a central processing unit (CPU), an auxiliary processor among several processors associated with the mobile device 200, a semiconductor-based microprocessor (in the form of a microchip or chip set), or generally any device for executing software instructions. When the mobile device 200 is in operation, the processor 202 is configured to execute software stored within the memory 210, to communicate data to and from the memory 210, and to generally control operations of the mobile device 200 pursuant to the software instructions. In an exemplary embodiment, the processor 202 may include an optimized mobile processor such as optimized for power consumption and mobile applications. The I/O interfaces 204 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 204 can also include, for example, a serial port, a parallel port, a small computer system interface (SCSI), an infrared (IR) interface, a radio frequency (RF) interface, a universal serial bus (USB) interface, and the like. The I/O interfaces 204 can include a graphical user interface (GUI) that enables a user to interact with the mobile device 200.

The radio 206 enables wireless communication to an external access device or network. Any number of suitable wireless data communication protocols, techniques, or methodologies can be supported by the radio 206, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media.

The memory 210 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 can include one or more software programs, each of which includes an ordered listing of executable instructions for implementing logical functions. In the example of FIG. 4, the software in the memory 210 includes a suitable operating system (O/S) 214 and programs 216. The operating system 214 essentially controls the execution of other computer programs and provides scheduling, input-output control, file and data management, memory management, and communication control and related services. The programs 216 may include various applications, add-ons, etc. configured to provide end user functionality with the mobile device 200. For example, exemplary programs 216 may include, but not limited to, an application for controlling the stabilizing spherical UAV camera assembly 10 including flight components and the plurality of cameras 28.

The processing device 100 is configured to control various aspects of the spherical UAV camera assembly 10 including the flight components and the plurality of cameras 28. Images or video from the plurality of cameras 28 can be stored in the data store 108 as well as transmitted to the mobile device 200 via the network interface 108 and the radio 206, via the I/O interfaces 104, 204, or the like.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A self-stabilizing spherical unmanned aerial vehicle (UAV) camera assembly, comprising:
   a stabilizer assembly;
   a plurality of motors coupled to the stabilizer assembly;
   a spherical camera mounting cage assembly disposed about and coupled to the stabilizer assembly; and
   a plurality of cameras coupled to an exterior of the spherical camera mounting cage assembly, thereby unobstructed by the stabilizer assembly.

2. The UAV camera assembly of claim 1, wherein the plurality of motors comprises one of a plurality of propellers and a plurality of ducted fans operable for lifting and controlling the UAV camera assembly.

3. The UAV camera assembly of claim 1, wherein the stabilizer assembly is operable for tilting the spherical camera mounting cage assembly about two axes with respect to the stabilizer assembly.

4. The UAV camera assembly of claim 1, wherein the stabilizer assembly is operable for rotating the spherical camera mounting cage assembly about a central axis with respect to the stabilizer assembly.

5. The UAV camera assembly of claim 1, wherein the plurality of cameras comprises a plurality of stereoscopic cameras adapted to obtain panoramic images free from obstructions from the stabilizer assembly.

6. The UAV camera assembly of claim 1, further comprising an on-board processor for processing signals from the plurality of cameras.

7. The UAV camera assembly of claim 6, wherein the on-board processor communicates with a mobile device for control of the UAV camera assembly and for providing images or video from the plurality of cameras.

8. A method for providing a self-stabilizing spherical unmanned aerial vehicle (UAV) camera assembly, comprising:
   providing a stabilizer assembly;
   providing a plurality of motors coupled to the stabilizer assembly;
   providing a spherical camera mounting cage assembly disposed about and coupled to the stabilizer assembly; and
   providing a plurality of cameras coupled to an exterior of the spherical camera mounting cage assembly, thereby unobstructed by the stabilizer assembly.

9. The method for providing the UAV camera assembly of claim 8, wherein the plurality of motors comprises one of a plurality of propellers and a plurality of ducted fans operable for lifting and controlling the UAV camera assembly.

10. The method for providing the UAV camera assembly of claim 8, wherein the stabilizer assembly is operable for tilting the spherical camera mounting cage assembly about two axes with respect to the stabilizer assembly.

11. The method for providing the UAV camera assembly of claim 8, wherein the stabilizer assembly is operable for rotating the spherical camera mounting cage assembly about a central axis with respect to the stabilizer assembly.

12. The method for providing the UAV camera assembly of claim 8, wherein the plurality of cameras comprises a plurality of stereoscopic cameras adapted to obtain panoramic images free from obstructions from the stabilizer assembly.

13. The method for providing the UAV camera assembly of claim 8, further comprising providing an on-board processor for processing signals from the plurality of cameras.

14. The method for providing the UAV camera assembly of claim 13, wherein the on-board processor communicates with a mobile device for control of the UAV camera assembly and for providing images or video from the plurality of cameras.

15. A self-stabilizing spherical unmanned aerial vehicle (UAV) comprising:
   a substantially spherical body comprising a stabilizer assembly, a plurality of motors coupled to the stabilizer assembly, and a spherical camera mounting cage assembly disposed about and coupled to the stabilizer assembly;
   a plurality of cameras coupled to the spherical camera mounting cage assembly, with views unobstructed by the substantially spherical body; and
   a processing device communicatively coupled to the plurality of cameras and the plurality of motors for control thereof.

16. The self-stabilizing spherical UAV of claim 15, wherein the plurality of motors comprises one of a plurality of propellers and a plurality of ducted fans operable for lifting and controlling the UAV camera assembly.

17. The self-stabilizing spherical UAV of claim 16, wherein the stabilizer assembly is operable for tilting the spherical camera mounting cage assembly about two axes with respect to the stabilizer assembly.

18. The self-stabilizing spherical UAV of claim 16, wherein the stabilizer assembly is operable for rotating the spherical camera mounting cage assembly about a central axis with respect to the stabilizer assembly.

19. The self-stabilizing spherical UAV of claim 16, wherein the plurality of cameras comprises a plurality of stereoscopic cameras adapted to obtain panoramic images free from obstructions from the stabilizer assembly.

20. The self-stabilizing spherical UAV of claim 19, wherein the on-board processor communicates with a mobile device for control of the UAV camera assembly and for providing images or video from the plurality of cameras.

* * * * *